Oct. 12, 1971  F. W. PERAZZELLA  3,611,752
SHAFT COUPLING
Filed Feb. 27, 1970  2 Sheets-Sheet 1
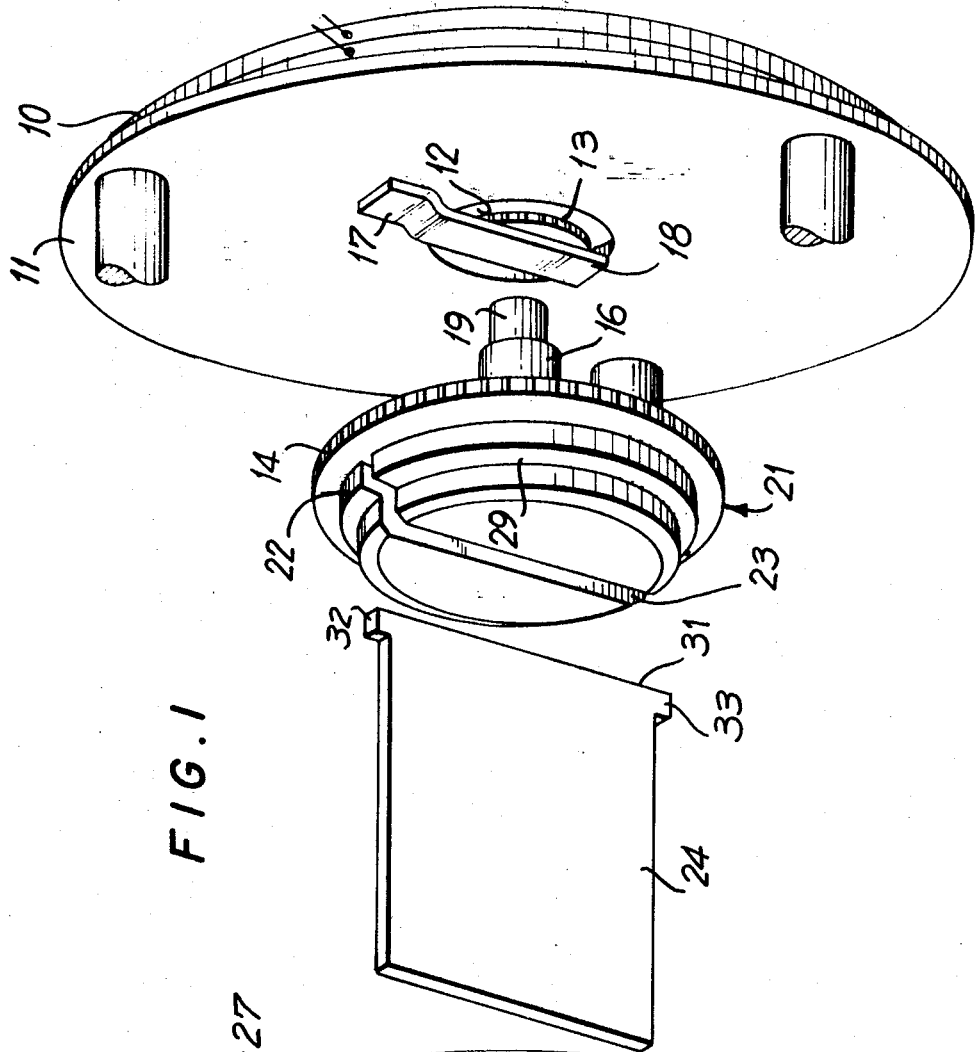
FIG.1
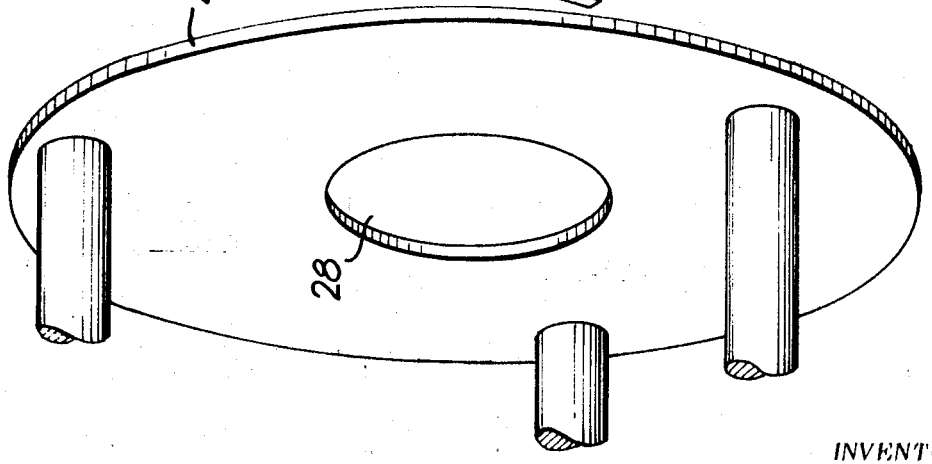
INVENTOR.
FRANK W. PERAZZELLA
BY
ATTORNEY Oct. 12, 1971   F. W. PERAZZELLA   3,611,752
SHAFT COUPLING Filed Feb. 27, 1970   2 Sheets-Sheet 2

INVENTOR.
FRANK W. PERAZZELLA

BY
ATTORNEY

United States Patent Office 3,611,752
Patented Oct. 12, 1971

3,611,752
SHAFT COUPLING
Frank W. Perazzella, Wolcott, Conn., assignor to North American Philips Corporation, New York, N.Y.
Filed Feb. 27, 1970, Ser. No. 15,038
Int. Cl. F16d 3/04
U.S. Cl. 64—7
3 Claims

ABSTRACT OF THE DISCLOSURE

A shaft coupling to transmit rotation from one shaft to another not necessarily co-linear therewith. The coupling comprises a blade mounted on one of the shafts and extending axially from the one shaft toward the other, one end of the blade having limited freedom of movement back anf forth in one direction transverse to the other shaft. The blade is captured in the one shaft by a groove which is wider than the blade, thereby allowing the free end of the blade limited freedom of movement. The captured end of the blade is substantially T-shaped to aid in its entrapment by other components of the assembled device.

FIELD OF THE INVENTION

The invention relates to shaft couplings and more particularly to universal joints which are used to transmit rotation from one shaft to another, where the two shafts may not be co-linear. Specifically, the present invention may be used in electrical components of radios or television sets where the shafts of control elements must be coupled together, and may be used, for example, where it is desirable to drive a standard potentiometer with an electric motor.

BACKGROUND OF THE INVENTION

It often arises, due to loose manufacturing tolerances, that the shaft of a motor, and that of potentiometer driven by the motor will be either axially or angularly displaced from each other to a small degree. In this situation means must be provided to couple the two shafts together in such a way that there is sufficient flexibility in the joint to allow for the mismatch, and yet to maintain an efficient connection.

It should be understood that the present invention is in no way intended to be limited to use with the above described electrical components, and may be used generally in any situation wherein matching of a pair of non co-linear rotating shafts is necessary.

The present invention uses a blade which is mounted at one end on one of the shafts and extends axially toward the other shaft in such a way as to allow its free end limited freedom of movement back and forth in one direction transverse to the other shaft. One end of the capturing shaft is provided with a slot which extends along an entire diameter of the end, and is wider than the captured end of the blade so as to allow a limited freedom of movement in the free end of the blade transverse to the shaft. The captured end of the blade is substantially T-shaped, and is at least as long as the length of the slot so that it may be effectively held in place by other components of the assembled device. The result is than when the capturing shaft is rotated, the blade will also rotate and its motion can be transmitted to another shaft which will be connected to its free end. The present invention, therefore, makes it possible to accommodate two shafts which may be either axially or angularly displaced to a limited extent with respect to each other.

One object of the present invention is to provide a shaft coupling to transmit rotation from one shaft to another not colinear therewith.

Another object of the present invention is to provide a shaft coupling which is simple to construct and to assemble.

Still another object of the present invention is to provide a shaft coupling which is inexpensive to manufacture or otherwise utilize.

BRIEF DESCRIPTION OF THE DRAWINGS

For a further understanding of the present invention, reference may be had to the accompanying drawings in which:

FIG. 1 is an exploded representation of the present invention showing the relationship between the various components.

BRIEF DESCRIPTION OF THE PREFERRED EMBODIMENTS

Figure 2:
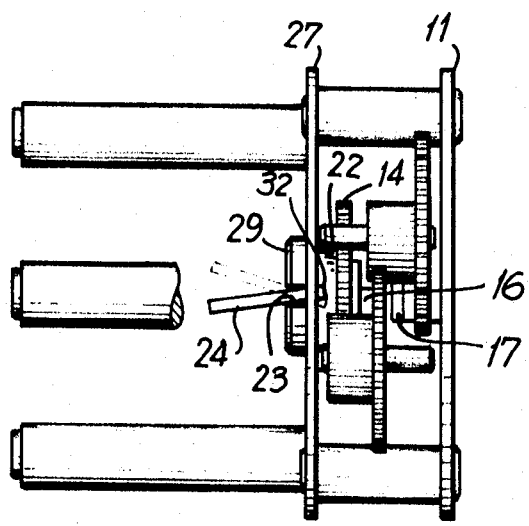
FIG. 2 is a top view of the assembled device.

Referring now to the drawings, FIG. 1 depicts an operational arrangement of the components of the present invention, although it is to be understood that the present invention is not to be limited, for example, to use with an electric motor 10. In this particular embodiment, the motor is mounted on a support plate 11 which has a hole 12 in its center. The drive shaft of the motor extends into the hole 12, and mounted thereon is a drive pinion 13 which, under the present circumstances, will normally be meshed into a standard gear train, shown in FIG. 2, which will provide the desired step-up or step-down ratio to control the final output rotational speed of the motor. One gear wheel 14 of the gear train is shown, and it is to be staked in a known manner to a shaft 16 which is to be rotated at a predetermined speed. The hole 12 is protected by a somewhat L-shaped finger 17 which is integral with the plate 11 and substantially covers the hole. Its purpose is to provide an abutment surface 18 for one end 19 of the shaft 16. In the illustrated embodiment, the shaft 16 is not connected to the finger 17, but merely abuts it at its flat portion 18, the finger being strong enough to support the pressure of the shaft 17 when the mechanism is in its assembled state.

One end of the shaft 16 is provided with a two level stepped configuration transverse to the axis of rotation, and generally denoted by the reference numeral 21, the innermost level 22 of which has the largest diameter and is contiguous to the gear wheel 14. In the present embodiment the stepped configuration 21 and the shaft 16 are unitary, and are formed of an appropriate substance, such as, for example, a lightweight metal of some desired type.

Passing entirely through the end of the stepped configuration 21, and lying along one diameter thereof, is a deep slot 23, which actually divides the stepped configuration in half, and at the base of which is the gear wheel 14. The purpose of the slot 23 is to capture one end of a plate 24 which will abut against the gear wheel 14 and extend axially from the slot toward a second shaft 26 which is to be coupled with the shaft 16. The width of the slot 23 is greater than that of the plate 24 for the purpose of allowing a loose fit of the plate within the slot in order to give to the plate a limited freedom of movement back and forth in a direction transverse to the axes of rotation of the two shafts. This freedom of movement of the plate 24, which is illustrated in FIG. 2, enables it to compensate for a possible misalignment of the two shafts as the device is being assembled. It is apparent that any axial displacement of the shaft 26 with respect to the shaft 16 and within the limits of movement of the plate, may be compensated for by the ability of the free end of the plate 24 to move back and forth in one direction transverse to the axis of rotation of the two shafts, thereby to reach the position of the errant shaft and to be connected thereto. Further, nearly any potential degree of angular displacement of the two shafts may be compensated for according to the depth of entrapment of the free end of the plate 24 by the shaft 26 as the coupling is completed during assembly of the device.

The mounting for the shaft 16 is provided within a second support plate 27 by a central aperture 28, the diameter of which is equal to the width of the free end of the plate 24 which is to pass through the aperture toward the second shaft 26. The first, or outer level 29 of the stepped configuration 21 also has a diameter equal to that of the aperture 28, and it is designed to pass through the aperture until it is stopped by the inner level 22 which cannot pass through the aperture, since its diameter is too large. The result is that the outer level 29 becomes the bearing on which the shaft 16 is to rotate during operation of the assembled device. The larger inner level 22 is necessary as a spacer to separate the gear wheel 14 from the inner surface of the support plate 27 in order to insure that the rotation of the shaft 16 be as efficient and free from friction as is possible.

The captured end of the plate 24 is somewhat T-shaped, as indicated by reference numeral 31, and is at least as long as is the length of the diameter of the inner level 22 of the stepped configuration. As the plate 24 passes through the aperture 28, stubs 32 and 33 of the captured end will abut the inner surface of the support plate 27 and prevent the plate 24 from continuing through and on out the other side of the aperture. FIG. 2 illustrates the assembled position of these components of the invention, showing the stub 32 trapped against the inner surface of the support plate 27 thereby to secure the plate 24 in its proper position within the slot 23 of the stepped configuration on the shaft 16. The free end of the plate 24 will be able to move back and forth to a limited extent, as illustrated, thereby to reach any probable displacement of the shaft 26 from the shaft 16, and to be connected thereto. The means of connecting the plate 24 to the shaft 26 are not shown, as such means are well known in the art and do not include a part of the present invention.

What is claimed is:
1. A shaft coupling comprising:
 (A) a first shaft;
 (B) a second shaft to be linked with said first shaft; and
 (C) a blade non-rotatably mounted on said second shaft extending axially between said first and second shafts, one end of said blade having limited freedom of movement back and forth in one direction transverse to said first shaft, said second shaft comprising a slot in one end along one diameter of said end to receive the other end of said blade, the length of said slot being equal to the length of said diameter, said blade also comprising lateral stubs extending outwardly, the width of said one end and said stubs being greater than the length of said slot.
2. The shaft coupling of claim 1 comprising, in addition: a support plate comprising an aperture therethrough of a diameter greater than the width of said blade but less than the total distance between the outer ends of said stubs, said slotted end of said second shaft extending adjacent said support plate.
3. The shaft coupling of claim 2 in which said slotted end of said second shaft extends through said opening in said support plate and said second shaft has an outer level of diameter greater than the diameter of said opening in said support plate.

References Cited

UNITED STATES PATENTS

| 1,349,329 | 8/1920 | Dispot | 64—31 |
| 2,612,764 | 10/1952 | Wiken | 64—31 X |
| 3,338,585 | 8/1967 | Poorman | 64—31 X |

FOREIGN PATENTS

| 55,094 | 8/1938 | Denmark | 64—31 |

KENNETH W. SPRAGUE, Primary Examiner

U.S. Cl. X.R.

64—31